Figure 1:
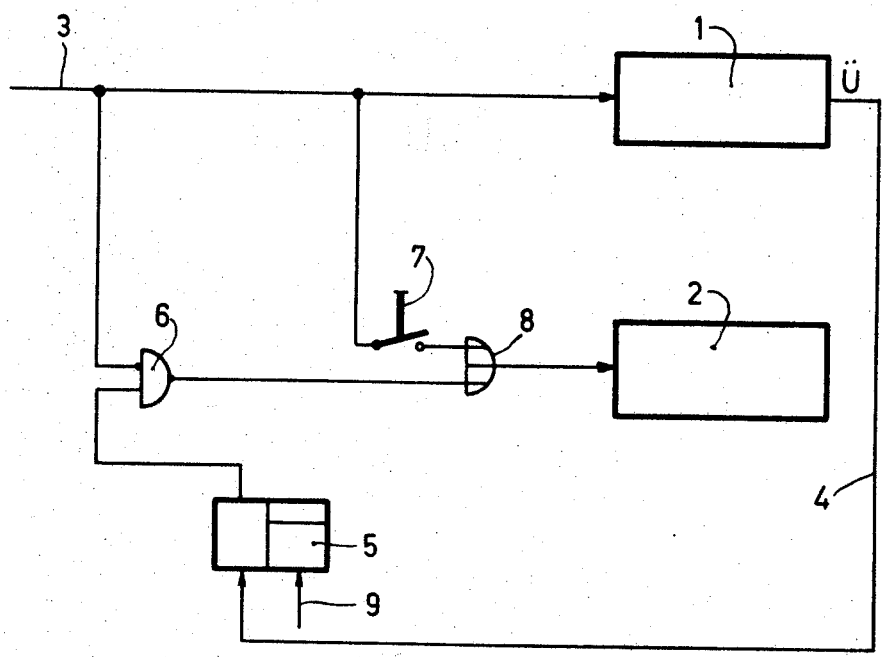

United States Patent

[11] 3,582,636

[72] Inventor Uwe Bertram
Hamburg, Germany
[21] Appl. No. 786,585
[22] Filed Dec. 24, 1968
[45] Patented June 1, 1971
[73] Assignee U.S. Philips Corporation
New York, N.Y.

[54] CIRCUIT ARRANGEMENT FOR CALCULATING A CHECK DIGIT
6 Claims, 2 Drawing Figs.
[52] U.S. Cl. .................................. 235/153,
235/61.7, 340/146.1
[51] Int. Cl. .................................. G06f 11/10,
G08c 25/00
[50] Field of Search .......................... 235/153,
61.7; 340/146.1

[56] References Cited
UNITED STATES PATENTS
| | | | |
|---|---|---|---|
| 2,886,240 | 5/1959 | Linsman | 235/153 |
| 2,911,149 | 11/1959 | Rouche | 235/153 |
| 3,430,037 | 2/1969 | Renelt | 235/153 |
| 3,448,254 | 6/1969 | Verhoeff | 235/153 |

*Primary Examiner*—Malcolm A. Morrison
*Assistant Examiner*—Charles E. Atkinson
*Attorney*—Frank R. Trifari

ABSTRACT: A circuit for calculating and employing a check digit, having two module M counters, the first counter coupled directly to a weighted series of pulses, the second counter responsive to a carry from the first counter for counting double the number of input pulses applied to the first counter, completion of the series providing the M complement of the check digit in said second counter, and providing the check digit to the circuit resulting in nonzero condition in the second counter of the digit sequence is in error.

INVENTOR.
UWE BERTRAM
BY
AGENT

CIRCUIT ARRANGEMENT FOR CALCULATING A CHECK DIGIT

The invention relates to a circuit arrangement for calculating a check digit for checking data by means of weighted transverse sums in accordance with the relation:

$$M - P = \sum_{i=1}^{m} G_i \cdot Z_i \bmod M$$

wherein $Z_i$ designates the digits, $m$ the number of digits, $i$ the place of the digit in the number, $P$ the check digits, $M$ an integer most differing from the divisor and $G_i$ the weights arrayed in dependence upon the places in the descending sequence of natural numbers.

Errors may occur in writing and/or transmitting data. In general it is required to assess these errors in an early stage. In order to assess any errors, digit groups are provided with one or more redundant check digits. A digit group provided with check digits then has the form: $Z_1, Z_2, Z_3, ... Z_m.P_1, ... P_k$. In writing or transmitting such guarded digit groups an investigation for errors may be carried out when the check digits are calculated a second time and compared with the added check digits. Wiring or transmission is free of errors when the check digits correspond.

For the calculation of the check digits various methods are known. In most of them the calculation is carried out by weighted transverse sum formation of the digit groups in accordance with the relation:

$$M - P = \sum_{i=1}^{m} G_i \cdot Z_i \bmod M$$

Therein $G_i$ designates the weights, $Z_i$ the digits of the digit group, $m$ the number of digits exclusive of the check digit and $M$ an integer having no common factors with the possible values of $G_i$ and $Z_i$.

Known circuit arrangements for providing check digits form the products $G_i \cdot Z_i$ via a multiplying matrix. Such apparatus have a comparatively complicated electric structure. Other arrangements calculate the check digits by cyclic methods without multiplying matrix. Then the order of succession and the magnitude of the separate weights are fixed by the method and the circuit arrangement respectively.

There are known checking methods in which constant data such as account numbers are definitely provided with a check digit, the check digit being formed on the aforesaid law, whilst the weights thereof arrayed in the descending sequence of the natural numbers. In these cases the checking system cannot be modified and a most simple embodiment has to be found.

This problem is solved by the circuit arrangement according to the invention, which is characterized in that two mod M counters are provided, both of which count the pulses representing the incoming digit for every $M+Z_i$, whereas at each supplied digit the second counter receives the pulses coming in after the carry signal of the first counter in two-fold.

The checking function is fulfilled in a very simple manner by switching off the direct counting of the $M+Z_i$ pulses by the second counter.

Figure 2:
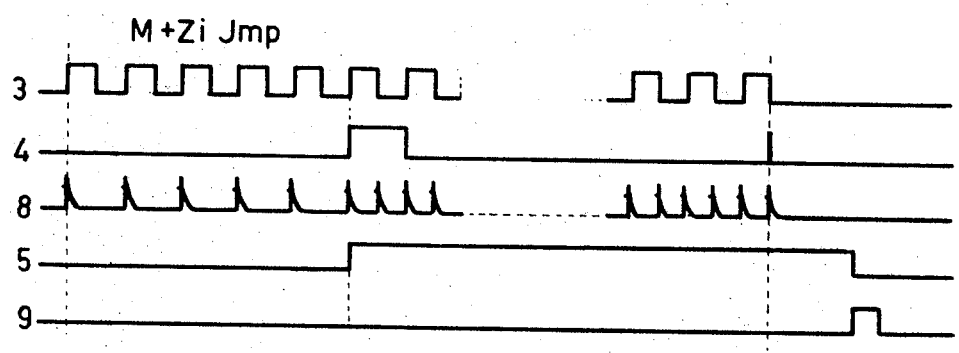

The drawing shows one embodiment of the invention.
Therein
FIG. 1 is the basic diagram,
FIG. 2 illustrates the pulse diagram for the calculation of a check digit.

Prior to the calculation of the check digit mod $M$ counter 1 and mod $M$ counter 2 are in the rest position 0=$M$ and the switch 7 is closed. For writing the first digit $Z_1, M+Z_1$ pulses are supplied through the conductor 3, which pulses are counted in the two counters. When the counter 1 reaches after $M$ pulses, the position 0=$M$, the AND gate 6 is released through the bistable trigger 5, after energization along line 4 and the further $M+Z_1-M=_1$ pulses are counted in addition in the counter 2 through the OR gate 8. The counter 1 is at the end of the pulse sequence in the position $Z_1$ and the counter 2 is in the position $Z_1+Z_1$. After the termination of the counting operation the bistable trigger is put into the rest position by a resetting pulse via the conductor 9.

At the supply of the second digit $M+Z_2$ pulses are applied through the pulse conductor 3 and counted again in both counters. After $M-Z_1$ pulses the counter position 0=$M$ of the counter 1 is again exceeded, that is to say, the AND gate 6 is released and the further $M+Z_2-(M-Z_1)=Z_2+_1$ pulses are again counted in addition in the counter 2. At the end of the counting operation the position of the counter 1 is $Z_1+Z_2$ and that of the counter 2 is $2.Z_1+Z_2+_1+ZA2=3.Z_1+2.Z_2$.

In the same manner the counting operation is continued up to the digit $Z_m$. The contents of the counter 2 are then the $M$ complement of the check digit.

$(m+1).Z_1+m.Z_2+(m-1).Z_3+...+2.Z_m = MAIP \bmod M$.

For checking digit sequences with check digits the check digit is also supplied. In order to reobtain the same weight factors in spite of the additional count of the test digit, the direct supply of the $M+Z_1$ pulses to the counter 2 is interrupted by a switch 7. At the beginning of the count the counters 1 and 2 are again in the position 0=$M$. After counting of the pulse sequence $M+Z_1$, only the pulses of the pulse conductor 3 are counted in the counter 2, which pulses are supplied via the AND gate 6 after the counter 1 has reached the position 0=$M$. It is then $M+Z_1-M=_1$ pulses. The counters 1 and 2 are both in the position $Z_1$.

After $M+Z_2$ pulses have been written, counting starts in counter 2, when after $M-Z_1$ pulses the AND gate 6 is released. The counter 2 thus receives $M+Z_2-(M-Z_1)$ pulses. The new position of the counter 2 is then $Z_1+Z_2+ZA1=2.Z_1+ZA2$.

The counting operation is continued in the same manner for all digits inclusive of the check digit so that at the end of the calculation the counter 2 indicates:

$(m+1).Z_1+m.Z_2+(m-1).Z_3+...+2.Z_m+PAx0 \bmod M$.

If the result of the check is not 0=$M$, an error is made. With reference to a numerical example the calculation and the check operations will be explained.

$M=11$; $m=3$; $Z_1, Z_2, Z_3 = 492$.

Calculation of the check digit for the digit sequence 492;

| Writing | Position of counter 1 | Position of counter 2 |
|---|---|---|
| 1. digit 4 | 4 | 4+4 |
| 2. digit 9 | 4+9 | 2·4+9+(4+9) |
| 3. digit 2 | 4+9+2 | 4·4+3·9+2·2=47=3 mod 11 |
| | | =3 mod 11=11−$P$, $P$=8 $P$=11−3=8 |

| Test of controllable digit sequence 4928 | | |
|---|---|---|
| 1. digit 4 | 4 | 4 |
| 2. digit 9 | 4+9 | 4+4(4+9) |
| 3. digit 2 | 4+9+2 | 2·4+9+(4+9+2) |
| Test digit 8 | 4+9+2+8 | 3·4+2·9+2+(4+9+2+8)=4·4+3·9+2·2+8=0 mod 11 |

In the circuit arrangement of FIG. 1 the additional pulses are produced across the AND gate 6 and the OR gate 8 by applying the input pulses in the inverted state to one input of the AND gate 6 so that front and rear flanks of the input pulses form the rhythm of the counter 2. In order to permit these flanks to be separately operative, pulses have to be derived therefrom before the OR gate 8, the period of which pulses is short as compared with the duration of the input pulses, for example, by differentiation of the flanks as is indicated in the pulse diagram of FIG. 2.

What I claim is:
1. A circuit arrangement for calculating a check digit from a plurality of digits for data control by means of weighted transverse sums in accordance with the relation:

$$M - P = \sum_{i=1}^{m} G_i \cdot Z_i \bmod M$$

Wherein $Z_i$ designates the digits, $m$ the number of digits, $i$ the place of the digit, $P$ the check digit, $M$an integer having no common factors with the possible values of $G_i$ and $Z_i$, and $G_i$ the weights arithmetically arrayed in dependence upon the place in the descending sequence of the natural numbers, comprising first and second mod M counters, first means introducing each of said weighted digits in pulse form in descending sequence to said first counter, second means introducing each of said digits in weighted form, for summation as digits pulses, in descending sequence to said second counter, and third means responsive to a carry signal from said first counter for doubling the input pulses to said second counter, the state of said second counter after introduction of all of said plurality of digits representative of said check digit.

2. The combination of claim 1 wherein said circuit arrangement provides an indication of erroneous digit transmission of said plurality of digits with said check digit, said circuit arrangement including a switch in said second means, said switch being in an open position, said first means for introducing each of said digits in weighted form for summation as pulses in descending sequence to said first counter said check digit submitted last, said second counter counting pulses only at said double rate upon activation of said third means, the state of said second counter after introduction of all of said plurality of digits including said check digit indicating a state of 0 mod $M$ for error free transmission.

3. A circuit arrangement as claimed in claim 1 wherein said check digit P is the complement of the resultant position of the second mod $M$ counter.

4. A circuit arrangement as claimed in claim 1 wherein the carry signal of the first counter sets a bistable trigger, the output of said bistable trigger being connected to one input of an AND gate, the other input of said AND gate receiving input pulses from said first means the output of said AND gate being connected through an OR gate to the counting input of said second counter, said second means applying said input pulses through a second input of said OR gate to the counting input of said second counter.

5. A circuit arrangement as claimed in claim 4 wherein said second means includes a switch which is open at the check of a digit sequence already provided with a check digit and in that said second mod $M$ counter delivers an error signal, if it has not reached its 0-position after complete writing of a digit sequence provided with said check digit.

6. A method of calculating a check digit from a plurality of digits and using said check digit to check accuracy of transmission of said plurality of digits, each of said digits represented by a plurality of pulses, in descending order of significance, comprising the steps of counting in a module M counter said pulses in accordance with the relationship $$(m+1).Z_1+M.Z_2+(m-).Z_3+...2.Z_m = M-aP \mod M$$

wherein $m$ is the number of digits in said plurality, $Z$ is the digit in descending order of significance, $M$ is the module of said counter, and $P$ is the check digit, said counter at the completion of said count providing an indication of said check digit $P$, and counting in said counter a transmitted plurality of said digits including said check digit in accordance with the relationship $$(m+1).Z_1+m.Z_2+(m-1).Z_3+...2.Z_m+P$$

wherein a resultant of other than 0 mod $M$ indicates error in said transmission.

PO-1050
(5/69)

UNITED STATES PATENT OFFICE
CERTIFICATE OF CORRECTION

Patent No. 3,582,636            Dated June 1, 1971

Inventor(s) Uwe Bertram

It is certified that error appears in the above-identified patent and that said Letters Patent are hereby corrected as shown below:

Col. 1, line 46, after "on" insert --the basis of--;

line 46, "whilst" should be --while--;

Col. 1, line 72, "$M+Z_1-M=_1$" should be --$M+Z_1-M=Z_1$--;

Col. 2, line 5, "$M+Z_2-(M-Z_1)=Z_2+_1$" should be --$M+Z_2-(M-Z_1)=Z_2+Z_1$--;

line 8, "$2.Z_1+Z_2+_1+ZA2=3.Z_1+2.Z_2$" should be --$2.Z_1+Z_2+Z_1+Z_2=3.Z_1+2.Z_2$--;

line 12, "MA1P mod M" should be --$M - P$ mod $M$--;

line 22, "$M+Z_1-M=_1$" should be --$M+Z_1-M=Z_1$--;

line 27, "$Z_1+Z_2+ZA1=2.Z_1+ZA2$" should be --$Z_1+Z_2+Z_1= 2.Z_1+Z_2$--;

line 31, "$...+2.Z_m+PAx0$ mod M" should be --$...+2.Z_m+P = 0$ mod $M$--;

IN THE CLAIMS

Claim 1, in the formula $\sum_{i=i}^{m}$ should be -- $\sum_{i=1}^{m}$

Claim 6, in the first formula:
"$(m+1).Z_i+M.Z_2+(m-).Z_3+...2.Z_m=M-aP$ mod $M$"
should be
---$(m+1).Z_i+m.Z_2+(m-1).Z_3+...2.Z_m=M- P$ mod $M$--

Signed and sealed this 5th day of September 1972.

(SEAL)
Attest:

EDWARD M. FLETCHER, JR.          ROBERT GOTTSCHALK
Attesting Officer                   Commissioner of Patents